(12) United States Patent
Alversson

(10) Patent No.: US 7,172,064 B2
(45) Date of Patent: Feb. 6, 2007

(54) DEVICE FOR FEEDING A WALL FRAME

(75) Inventor: Arne Alversson, Falkenberg (SE)

(73) Assignee: Randek BauTech AB, Falkenberg (SE)

( * ) Notice: Subject to any disclaimer, the term of this patent is extended or adjusted under 35 U.S.C. 154(b) by 460 days.

(21) Appl. No.: 10/450,511

(22) PCT Filed: Dec. 17, 2001

(86) PCT No.: PCT/SE01/02789

§ 371 (c)(1),
(2), (4) Date: Dec. 10, 2003

(87) PCT Pub. No.: WO02/47874

PCT Pub. Date: Jun. 20, 2002

(65) Prior Publication Data

US 2004/0089696 A1    May 13, 2004

(30) Foreign Application Priority Data

Dec. 15, 2000  (SE) .................................... 0004653

(51) Int. Cl.
B65G 15/00    (2006.01)
(52) U.S. Cl. .................................... 198/817; 198/625.5
(58) Field of Classification Search ............ 198/626.3, 198/626.5, 817, 861.1, 465.1, 465.4, 625.5
See application file for complete search history.

(56) References Cited

U.S. PATENT DOCUMENTS 3,564,702 A    2/1971 Hurn et al.
3,726,389 A *  4/1973 Klein et al. .................. 198/817
3,897,869 A *  8/1975 Michael .................... 198/626.6
5,095,605 A    3/1992 Tonus
5,368,643 A * 11/1994 Kuster ...................... 198/626.5
5,615,122 A    3/1997 Lacrosse
5,873,155 A *  2/1999 Jokela ........................ 198/817
6,769,534 B2* 8/2004 Lee ............................. 198/817
6,902,052 B2* 6/2005 Prentice et al. ............. 198/817

FOREIGN PATENT DOCUMENTS

AU        686968      2/1998
FR      2 354 864    6/1976

* cited by examiner

Primary Examiner—James R. Bidwell
(74) Attorney, Agent, or Firm—McGinn IP Law Group, PLLC

(57) ABSTRACT

The present invention relates to a device for feeding a planar section, e.g. a wall element, in relation to one or more working stations, e.g. nailing and/or hole making stations, the planar section having an upper portion (2) and a lower portion (1) and intermediate pieces (3) inteconnecting the upper portion (2) with the lower portion (1), a first conveyor (23) being intended for the upper portion (1) or the lower portion (2), a second conveyor (24) being intended for other portion, extending in parallel with the first conveyor (23) and being switchable for increasing or decreasing the distance between the conveyors (23, 24) and both of the conveyors (23, 24) being disposed to cooperate with carriers (21, 22) displaceable therealong for displacement of the portions (1, 2, 3) along the conveyors (23, 24).

20 Claims, 4 Drawing Sheets

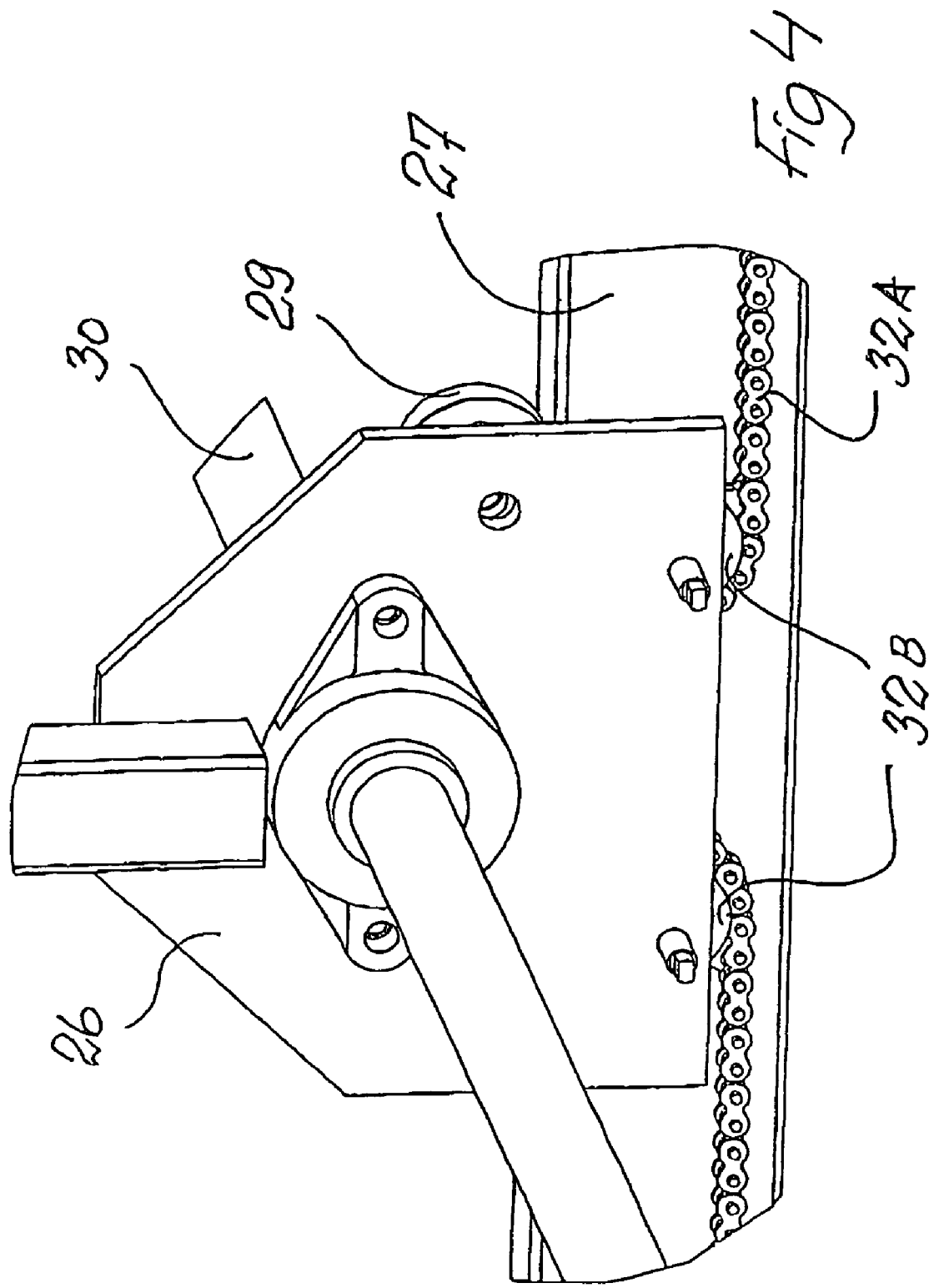

DEVICE FOR FEEDING A WALL FRAME

BACKGROUND OF THE INVENTION

The present invention relates to a device for feeding a planar section, such as a wall element, in relation to one or more work stations.

Prior art devices of the above-mentioned type have a complicated design and construction and are difficult, if not totally impossible, to switch rapidly and easily for handling planar sections of different heights or distances between the upper portion and lower portion. Further, prior art constructions lack the possibility of simple adjustment of the height of the planar section or the distance between the upper portions and the lower portion.

SUMMARY OF THE INVENTION

The task forming the basis of the present invention is to realise an improved device and to obviate, or at least reduce, the drawbacks inherent in prior art devices.

This task is solved in the device intimated by way of introduction according to the present invention as described herein.

The present invention realises a device possessing great versatility, in particular as regards adaptability to planar sections or wall elements of different heights, and adjustability for solving temporary clamping situations, as well as adjustments while the work is in progress. These qualities afford the possibility of attaining considerably improved accuracy and smaller tolerances in respect of the finished section or element. Further, considerably higher work rates are made for than in prior art devices.

BRIEF DESCRIPTION OF THE DRAWINGS

The present invention will be described hereinbelow in greater detail with reference to the accompanying drawings.

FIG. 4 is a photographic illustration of the parts in FIG. 3 from the opposing side in relation to FIG. 3.

DETAILED DESCRIPTION OF THE EXEMPLARY EMBODIMENTS

Figure 1:
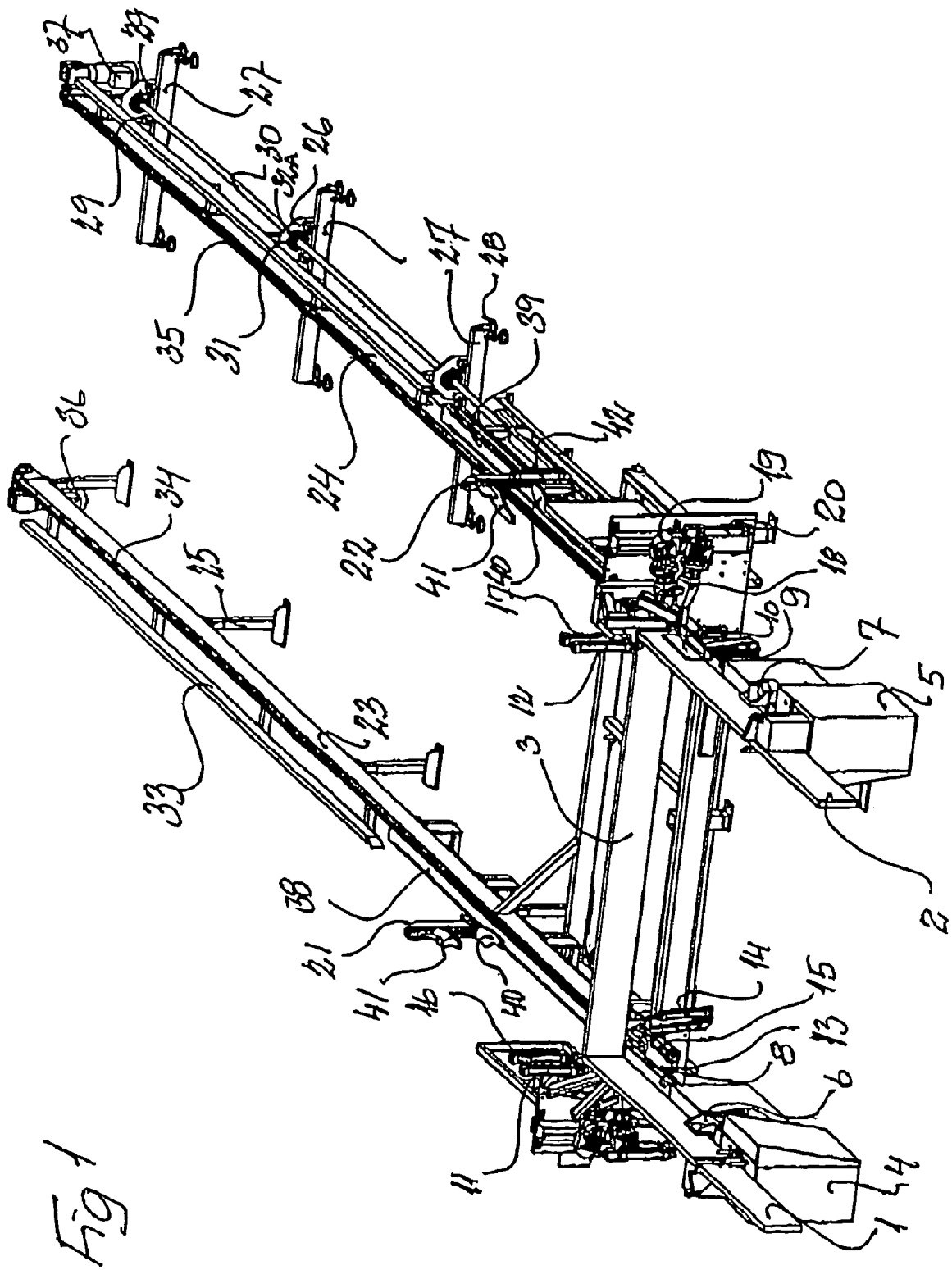
FIG. 1 is a perspective view of a device according to one embodiment of the present invention.
Figure 2:
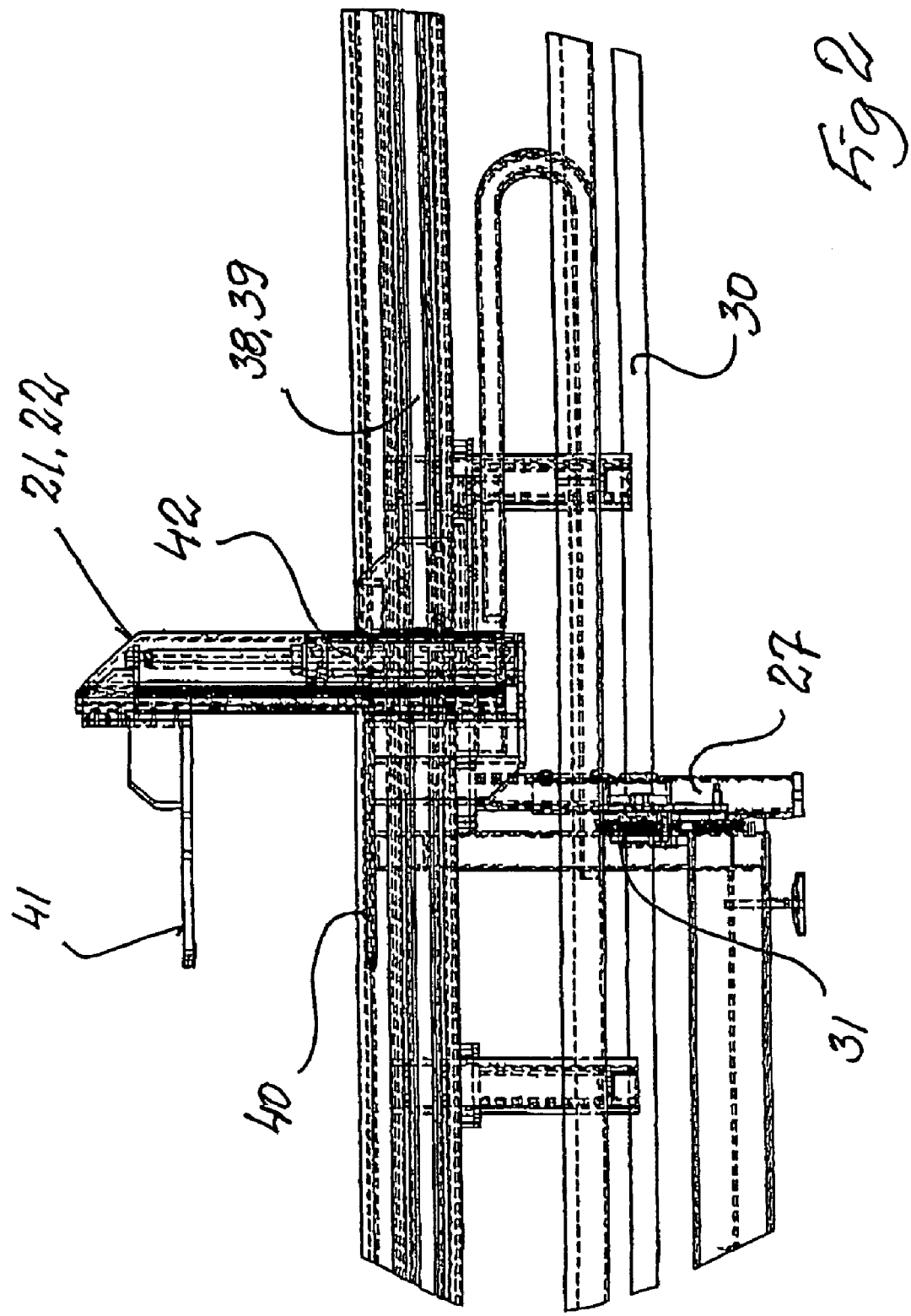
FIG. 2 is a side elevation of a part of the device of FIG. 1.

The embodiment of a device according to the present invention shown on the drawings will be described in greater detail in connection with the manufacture of a construction element, e.g. a wall element. This normally consists of a ground plate 1, a top plate 2 and a number of joists 3 of which only one is shown in FIG. 1. The joists 3 are placed between the ground plate 1 and the top plate 2 with suitable spacing, which normally is a centre-to-centre spacing of 600 mm. Both the ground plate 1 and the top plate 2 rest on a sawing unit 4 and 5, respectively, a jointing unit 6 and 7, respectively, and a substrate 8 and 9, respectively. The sawing units 4, 5 usually consist of a raisable and lowerable circular saw. The jointing units 6, 7 are normally intended for nailing in place of a joint plate. The substrates 8 and 9 have on the outside a support 10 which determines the distance between the ground plate 1 and the top plate 2. A piston and cylinder assembly 11 and 12, respectively, serve for urging the ground plate 1 and top plate 2 against the substrate 8 and 9, respectively. Thus, the ground plate 1 and the top plate 2 are fixed in the illustrated position with the aid of the piston and cylinder assemblies 11, 12. With the ground plate 1 and the top plate 2 in this position, the intermediate piece or joist 3 is placed in the illustrated position, a support being provided at each end of the joist 3 against which the joist is urged with the aid of a lowerable arm 13. The arm 13 is switchable with the aid of a piston and cylinder assembly 15, while the support on the opposite side of the joist 3 is displaceable upwards and downwards with the aid of a piston and cylinder assembly 14. There is a similar arrangement at the opposite end of the joist 3, but this is not apparent in FIG. 1. A piston and cylinder assembly 16, 17 at each end of the corner between the ground plate and the joist 3 is disposed to urge the corner against the substrate in order that the parts will be flush with each other or on a level with each other before being fixed or nailed together to each other.

At each corner, there is provided a fixed nail gun 18 and a movable nail gun 19. The nail guns 18, 19 usually consist of pneumatic nailing units with nail band magazines for automatic nailing together of the parts to each other. The nail gun 19 is vertically displaceable with the aid of a piston and cylinder assembly 20 for nailing for placing nails throughout the entire height of the ground plate 1 and the top plate 2, respectively. At each corner, there may moreover be provided additional working devices, for example a drilling machine for making holes in the ground plate 1 and the top plate 2, respectively, while the parts are fed past the device. After the nailing of the ground plate 1 on the joist 3 and top plate 2 on the joist 3, the three of them are to be displaced away from the working stations and this is put into effect with the aid of a carrier 21 for the ground plate 1 and a carrier 22 for the top plate 2. The carrier 21 is disposed at a fixed conveyor 23, while the carrier 22 is disposed at a moving conveyor 24.

The conveyor 23 is supported on adjustable legs 25 while the moving conveyor 24 is supported by legs 25 which are provided with carriages 26. The legs 25 are vertically adjustable for adjusting the fixed conveyor to a suitable horizontal extent. The moving conveyor 24 is displaceable with the aid of the carriages 26 in a direction towards and away from the fixed conveyor 23 on rails or beams 27. These rails or beams 27 are supported from the substrate with the aid of vertically adjustable feet 28.

Figure 3:
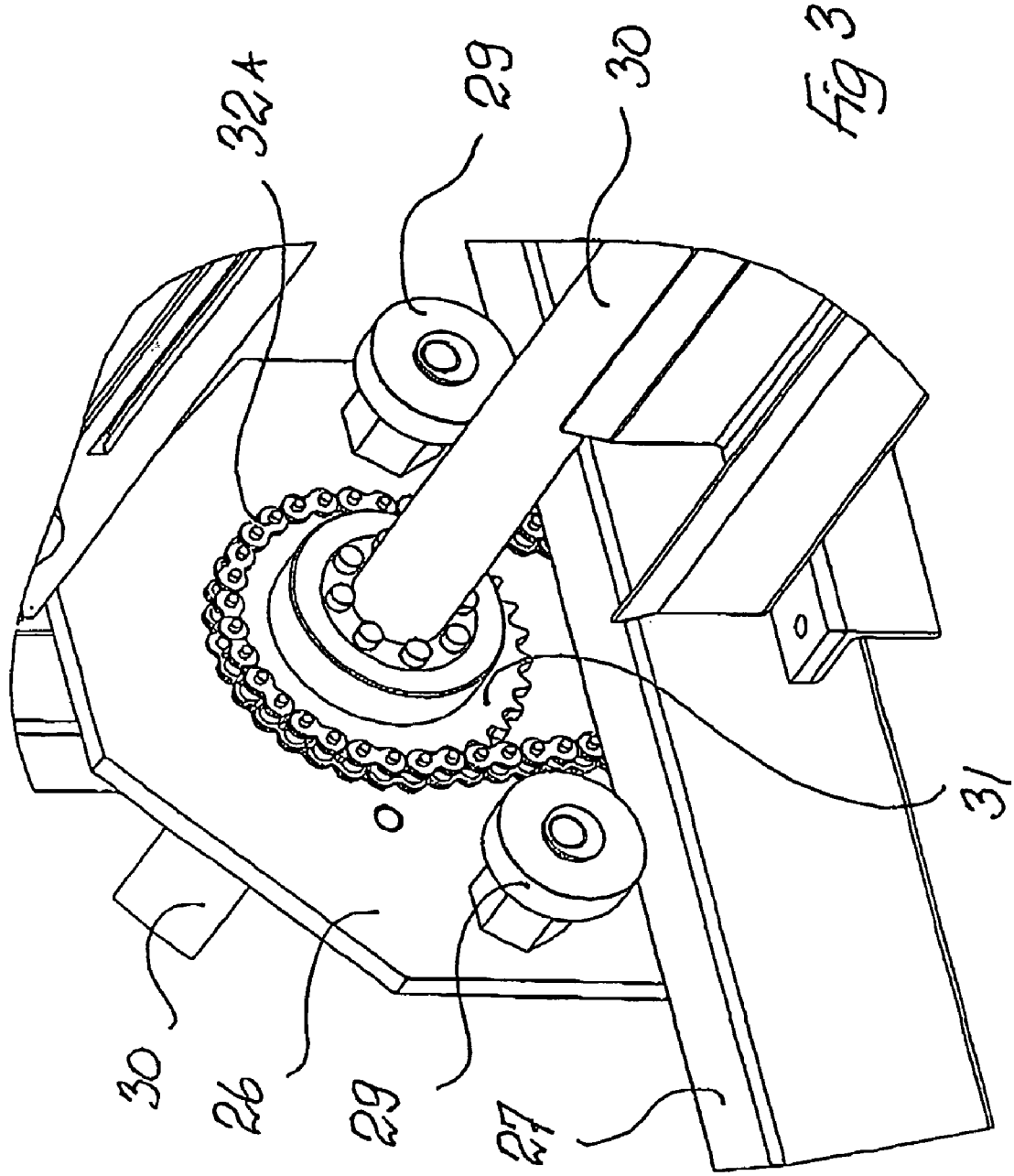
FIG. 3 is a photographic illustration of parts of the device of FIG. 1.

It is more clearly apparent from FIGS. 3 and 4 that the carriages 26 rest on the rails or beams 27 via wheels or rollers 29. A shaft 30 extends through each carriage and, at each carriage 26, has a toothed chain wheel 31 which is rotary with the shaft 30 which is driven by a suitable prime mover, not shown. A drive chain 32a extends over the toothed chain wheel 31 and extends down to a bending roller on shafts 32b at the lower edge of the carriage 26. The drive chain 32a extends from the bending roller along the lower edge of the beam or the rail 27 and from the bending roller to each end of the beam or the rail 27. The moving conveyor 24 is thus easy to move in a direction towards and away from the fixed conveyor 23 with the aid of the shaft 30, the geared chain wheel 31 and the chain 32a, the bending roller, as well as the rails or beams 27. As a result of this chain drive, it is possible to achieve an extremely high degree of accuracy of the adjustment of the moving conveyor in relation to the fixed conveyor 23.

Both the fixed conveyor 23 and the moving conveyor 24 have a chain 34, 35, respectively extending therealong for transport of the ready-processed element therealong. The chains are driven by a motor 36 for the chain 34 on the fixed conveyor 23 and a motor 37 for the feeding chain 35 of the moving conveyor 24.

The carriers 21 and 22 are movable along each respective conveyor 23, 24 with the aid of a toothed belt, not shown, or some other similar drive means which runs inside a beam 38, 39, respectively. Each carrier 21, 22 has a fixed clamping jaw 40 and a moving clamping jaw 41. The moving clamping jaw 41 is vertically displaceable with the aid of a piston and cylinder assembly 42.

After nailing of the corners between the ground plate 1, the top plate 2 and the joist 3, the corner or the end of the ground plate 1 or top plate 2, respectively is grasped between the clamping jaws 40, 41 on the carriers 21, 22 and displaced along the conveyors 23 and 24 a distance so far as is desirable for placing of the next intermediate piece or joist 3 or for making a hole in the ground plate 1 and/or the top plate 2. The carriers 21 and 22 are displaceable throughout the entire length of the beams 38, 39 but, if this distance is not sufficient for the manufactured element, the carriers 21 and 22 can release their grip and be moved back along the ground plate 1 and top plate 2, respectively, for a new grip and further transport of the manufactured element. When the element is finished, it is conveyed on the chains 34 and 35 to almost the end of the conveyors 23, 24 awaiting transport away therefrom either in the longitudinal direction or transversely thereof to a conveyor beside the illustrated conveyors or a conveyor in the longitudinal direction thereof as is deemed suitable in the plant in which the device according to the invention is placed.

Many modifications are naturally possible without departing from the inventive concept as defined in the appended claims. For example, it is possible to have several working stations and working tools than that which is apparent in the foregoing description.

The invention claimed is:

1. A device for feeding a planar section, of a wall element, in relation to one or more working stations, the planar section having an upper portion and a lower portion, and intermediate portions interconnecting the upper portion with the lower portion, the device comprising:
   a first conveyor that conveys one of the upper portion or the lower portion of the wall element; and
   a second conveyor that conveys the other of the upper portion and the lower portion, the second conveyor extending parallel with the first conveyor and is switchable for increasing or decreasing a distance between the conveyors, wherein
      said first and second conveyors are disposed to cooperate with carriers displaceable back and forth along the first and second conveyors for displacement of the portions along the first and second conveyors and the carriers are disposed substantially simultaneously to grasp about the upper portion and lower portion, respectively, and to displace the upper portion and lower portion along the first and second conveyors together with the intermediate portions.

2. The device as claimed in claim 1, wherein the carriers are displaceable independently of each other and/or synchronously with each other.

3. The device as claimed in claim 2, wherein the carriers are stepwise displaceable.

4. The device as claimed in claim 1, wherein the carriers include a lower, fixed clamping element and an upper clamping element reciprocally movable in relation to the lower clamping element for clamping and fixedly retaining the upper portion and/or the lower portion between the upper and lower clamping elements at least during displacement along the first and second conveyors.

5. The device as claimed in claim 1, wherein the second conveyor is mounted on a number of rails transversely disposed in relation thereto and on which same are reciprocally displaceable towards and away from the first conveyor for position in relation to a length of the intermediate portions and thereby the distance between the upper portion and the lower portion.

6. The device as claimed in claim 5, wherein the second conveyor is mounted on a number of carriages with wheels each for cooperation with the rails, and the carriages include drive means for displacement of the carriages on the rails.

7. The device as claimed in claim 6, wherein the drive means is interconnected by a shaft extending substantially parallel with the second conveyor for simultaneous displacement of the carriages on the rails.

8. The device as claimed in claim 7, wherein the drive means includes a chain wheel rotary with the shaft for a drive chain which extends over the chain wheel down to bending rollers on the carriage and thence in a direction towards the ends of the rails and form that distance along which the carriage is movable.

9. The device as claimed in claim 2, wherein the carriers have a lower, fixed clamping element and an upper clamping element reciprocally movable in relation to the lower clamping element for clamping and fixedly retaining the upper portion and/or the lower portion between them at least during displacement along the conveyor.

10. The device as claimed in claim 1, wherein said carriers are movable independently of said first and second conveyors.

11. A device for feeding a planar section of a wall element, in relation to one or more wall assembly work stations, the wall section having an upper portion, a lower portion, and at least one intermediate portion interconnecting the upper portion and the lower portion, the device comprising:
   a first conveyor that conveys one of the upper portion and the lower portion;
   a second conveyor that conveys the other of the upper portion and the lower portion, the second conveyor extending parallel with the first conveyor, the second conveyor being adjustably movable relative to the first conveyor;
   a first carrier disposed on the first conveyor; and
   a second carrier disposed on the second conveyor, wherein
      the first carrier and the second carrier are displaceable along their respective conveyors for displacement of the wall section portions along the first and second conveyors to the one or more wall assembly stations, and
      the first carrier and the second carrier are displaceable substantially simultaneously to grasp about the upper portion and lower portion, to displace the wall element along the first and second conveyors.

12. The device as claimed in claim 11, wherein the first carrier and the second carrier are displaceable independently of each other.

13. The device as claimed in claim 12, wherein the first carrier and the second carrier are displaceable synchronously with each other.

14. The device as claimed in claim 11, wherein the carriers have a fixed clamping element and a reciprocally movable clamping element opposed in relation to the fixed clamping element for clamping and fixedly retaining the upper portion and/or the lower portion between the clamping elements at least during displacement of the wall element along the first and second conveyors.

15. The device as claimed in claim 11, wherein the second conveyor is disposed on at least one rail transversely disposed in relation to the second conveyor, the second conveyor being adjustably movable along the at least one rail towards and away from the first conveyor.

16. The device as claimed in claim 15, wherein the second conveyor includes a plurality of carriages having at least one wheel in contact with a surface of the at least one rail, and drive means mounted on the carriage for displacement of the carriage on the at least one rail.

17. The device as claimed in claim 16, wherein the drive means is interconnected to the carriage by a shaft extending substantially parallel with the second conveyor for simultaneous displacement of the carriages on the rails.

18. The device as claimed in claim 16, wherein the drive means includes a chain wheel in rotary cooperation with the shaft, and a drive chain which extends over the chain wheel to bending rollers on the carriage and thence in a direction towards the ends of the rails and form that distance along which the carriage is movable.

19. A device for feeding a planar section, in relation to one or more working stations, the planar section having an upper portion and a lower portion, and intermediate portions interconnecting the upper portion with the lower portion, comprising:
 first means for moving one of the upper portion and the lower portion;
 second means for moving the other of the upper portion and the lower portion, the second means for moving extending in a direction parallel to the first means for moving, wherein one of the first means for moving and the second means for moving is movably adjustable relative to the other of the first means for moving and the second means for moving, for altering a distance between the first and second means for moving;
 a plurality of means for displacing the upper and lower portions back and forth along the first and second means for moving, wherein:
 the plurality of means for displacing are disposed to cooperate with the first means for moving and the second means for moving,
 the means for displacing are disposed substantially simultaneously to grasp about the upper portion and lower portion, respectively, and to displace the upper and lower portion along the first and second moving means together with the intermediate portions,
 the second means for moving comprises a plurality of support means transversely disposed in relation to the second means for moving and on which the second means for moving is reciprocally displaceable towards the first means for moving,
 the second means for moving further comprises a plurality of carriages with wheels that cooperate with the support means, the carriages include drive means for displacement of the carriages on the support means,
 the drive means are interconnected by a shaft extending substantially parallel with the first and second moving means for simultaneous displacement of the carriages on the support means, and
 the drive means includes a chain wheel rotary with the shaft for a drive chain which extends over the chain wheel to bending rollers on the carriage and thence in a direction towards the ends of the support means.

20. The device as claimed in claim 19, wherein said means for displacing are movable independently of said first and second means for moving.

* * * * *